United States Patent
Suzuki et al.

(10) Patent No.: US 7,109,703 B2
(45) Date of Patent: Sep. 19, 2006

(54) MAGNETIC CARBON NANOTUBE

(75) Inventors: Shuichi Suzuki, Hitachi (JP); Kishio Hidaka, Hitachiohta (JP); Mistuo Hayashibara, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/066,277

(22) Filed: Feb. 28, 2005

(65) Prior Publication Data
US 2005/0151536 A1 Jul. 14, 2005

Related U.S. Application Data

(62) Division of application No. 10/391,763, filed on Mar. 20, 2003, now Pat. No. 6,878,444.

(30) Foreign Application Priority Data
May 31, 2002 (JP) .............................. 2002-158492

(51) Int. Cl.
*G01R 33/00* (2006.01)
*B32B 5/16* (2006.01)

(52) U.S. Cl. ...................... 324/260; 428/375

(58) Field of Classification Search ............... 324/244, 324/260; 428/375, 389, 403, 408, 409, 900
See application file for complete search history.

(56) References Cited

U.S. PATENT DOCUMENTS

| | | | |
|---|---|---|---|
| 6,139,919 A | 10/2000 | Eklund et al. | |
| 6,146,227 A | 11/2000 | Mancevski | |
| 6,452,171 B1 * | 9/2002 | Moloni | 250/307 |
| 6,455,021 B1 | 9/2002 | Saito | |
| 6,528,785 B1 | 3/2003 | Nakayama et al. | |
| 6,538,262 B1 | 3/2003 | Crespi et al. | |
| 6,599,961 B1 | 7/2003 | Pienkowski et al. | |
| 6,759,653 B1 * | 7/2004 | Nakayama et al. | 250/306 |
| 6,800,865 B1 * | 10/2004 | Nakayama et al. | 250/492.3 |
| 2003/0029996 A1 * | 2/2003 | Nakayama et al. | 250/306 |
| 2003/0189351 A1 * | 10/2003 | Nakayama et al. | 294/99.1 |
| 2005/0244326 A1 * | 11/2005 | Colbert et al. | 423/447.1 |

FOREIGN PATENT DOCUMENTS

| | | |
|---|---|---|
| JP | 2000-321292 | 11/2000 |
| JP | 2001-089116 | 4/2001 |

OTHER PUBLICATIONS

CNR Rao et al., Nanotubes, 2001, CHEMPHSCHEM, Wiley-VCH-Verlag GmbH, all pages.*
Wei-Qiang Han, et al., "Aligned $CN_x$ nanotubes by pyrolysis of ferrocene/$C_{60}$ under $NH_3$ atmosphere", American Institute of Physics, Applied Physics Letters, vol. 77, No. 12, Sep. 18, 2000, pp. 1807-1809.

(Continued)

Primary Examiner—Edward Lefkowitz
Assistant Examiner—Kenneth J. Whittington
(74) Attorney, Agent, or Firm—Antonelli, Terry, Stout and Kraus, LLP.

(57) ABSTRACT

A carbon nanotube which shows ferromagnetism without a ferromagnetic metal imparted thereto and also has high thermal stability is provided. The carbon nanotube is characterized by being doped with nitrogen (which differs from carbon in valence electron) such that the doped nitrogen is segregated in a strip form at one end of the carbon nanotube. The thus doped nitrogen causes the carbon nanotube to have a difference in electron density and to show ferromagnetism. The present invention makes it possible to provide a carbon nanotube showing ferromagnetism without the necessity of imparting any magnetic metal thereto.

16 Claims, 4 Drawing Sheets

OTHER PUBLICATIONS

Arie et al., "Quantitative Analysis of the Magnetic Properties of a Carbon nanotube Probe in Magnetic Force Microscopy", *J. Phys. D: Appl. Phys.* 34 No. 9 (May 7, 2001) L43-L45.

Tomanek, "Magnetotransport and Intrinsic Magnetism in Carbon-based Nanotubes", no date available.

S. Wester et al., "Raman Characterization of Nitrogen Doped Multiwalled Carbon Nanotubes", Mat. Res. Soc. Symp. Procs. vol. 772 (2003).

Cespedes, et al., "Contact Induced Magnetism in Carbon Nanotubes", J. Phys: Condens. Matter 16 (2004) L155-L161.

S. L. Sung, et al., "Well-aligned nitride nanotubes synthesized in anodic alumina by electron cyclotron resonance chemical vapor deposition", *Applied Physics Letters*, vol. 74, No. 2, Jan. 11, 1999, pp. 1999, pp. 197-199.

R. Sen, et al., "B—C—N, C—N and B—N nanotubes produced by the pyrolysis of precursor molecules over Co catalysts", *Chemical Physics Letters*, vol. 287, May 8, 1998, pp. 671-676.

R. Droppa, Jr. et al., "Incorporation of nitrogen in carbon nanotubes", *Journal of Non-Crystalline Solids*, Nos. 299-302, 2002, pp. 874-879.

W. K. Hsu, et al., "Metallic behaviour of boron-containing carbon nanotubes", *Chemical Physics Letters*, vol. 323, Jun. 23, 2000, pp. 572-579.

A. S. Kotosonov, et al., "Diamagnetism of Boron-Doped Carbon Nanotubes", *Eurocarbon*, vol. 1, 2000, pp. 461-462 (State Research Institute of Graphite, No. 0219).

\* cited by examiner

MAGNETIC CARBON NANOTUBE

CROSS-REFERENCE TO RELATED APPLICATIONS

This application is a Divisional application of prior application Ser. No. 10/391,763, filed Mar. 20, 2003, now U.S. Pat. No. 6,878,444, the contents of which are incorporated herein by reference in their entirety.

BACKGROUND OF THE INVENTION

The present invention relates to a carbon nanotube and to an apparatus provided therewith.

A carbon nanotube is a microscopic material composed mainly of carbon. It has a very large aspect ratio, with its diameter being a few nanometers and its length being hundreds to thousands of nanometers. Therefore, it is expected to be applied to scanning probe microscopes (SPM), typified by atomic force microscopes (AFM) and scanning tunneling microscopes (STM), which depend for their resolution largely on the radius of curvature of the tip of the sensing probe.

Among SPMs, there is a magnetic force microscope (MFM) which employs a ferromagnetic sensing probe to read a magnetic gradient in a sample. When a carbon nanotube, which is a paramagnetic substance having the stable σ-π bond, is to be applied to an MFM, it needs to have ferromagnetism. This objective can be achieved by attaching, in any way, a ferromagnetic metal to the tip or inside of the carbon nanotube. The foregoing technique is applicable not only to an MFM, but also to any apparatus requiring ferromagnetism.

A method of imparting ferromagnetism to the tip of a carbon nanotube is disclosed in Japanese Patent Laid-open No. 321292/2000, and a method of causing a carbon nanotube to include a ferromagnetic metal is disclosed in Japanese Patent Laid-open No. 89116/2001.

Unfortunately, a composite material, which is composed of a carbon nanotube and a ferromagnetic metal, has a problem concerning the strength of the bond between them. If a carbon nanotube with iron as a ferromagnetic metal is used as a sensing probe for an MFM, there is the possibility that iron particles will drop off, or that the probe will be broken, when the probe is brought into contact with a sample. Such a problem would occur when the shape of the sample is measured by use of the tapping mode, in which the sample is tapped with a vibrating probe, or by use of the contact mode, in which the sample is scanned with a probe in contact with it.

There is another problem which relates to the temperature at which the probe is used. For example, a probe with iron as a ferromagnetic metal has difficulties in the measurement of magnetism at high temperatures exceeding 770° C., which is a Curie point of iron. It is difficult to carry out stable measurement at high temperatures, even under the Curie point, because the amount of magnetization usually decreases with temperature, thereby resulting in noise. The foregoing problem also arises when the probe comes into contact with a sample, thereby generating heat.

SUMMARY OF THE INVENTION

It is an object of the present invention to provide a carbon nanotube which exhibits ferromagnetism without a ferromagnetic metal being attached thereto, and which possesses a high thermal stability.

The present invention is directed to a carbon nanotube that is doped with nitrogen, which differs in valence electron from carbon, such that the nitrogen segregates in a strip form at one end thereof. The segregated nitrogen gives rise to a difference in electron density, thereby exhibiting ferromagnetism. Thus, a carbon nanotube can be obtained which exhibits ferromagnetism without the necessity of a magnetic metal being attached thereto.

The effect of the present invention is produced by a carbon nanotube which is doped with nitrogen and possesses a magnetic property. The invention is characterized by the following features.

The carbon nanotube is doped with nitrogen such that the doped nitrogen segregates at one end thereof.

The carbon nanotube is doped with nitrogen such that the doped nitrogen segregates at only one end thereof.

The carbon nanotube possesses a carbon-nitrogen mixed region at one end thereof.

The carbon nanotube possesses a carbon-nitrogen mixed region at only one end thereof.

The carbon nanotube has at least one end thereof that is open.

The carbon nanotube is doped with nitrogen in an amount of 0.1–30%, in terms of atomic ratio, of the total amount thereof.

The carbon nanotube possesses a metal cap, is doped with nitrogen, and has one end thereof open.

The carbon nanotube possesses Curie points of 770° C. and above.

The magnetism of the carbon nanotube is ferromagnetism.

The present invention is also directed to a magnetic force detector consisting of a laser emitter, a reflecting mirror, an optical detector, and a cantilever to which is attached a carbon nanotube, serving as a magnetic probe, which is doped with nitrogen and exhibits magnetism.

The present invention is also directed to a head for a vertical magnetization memory consisting of an exciter, a main magnetic pole, and an auxiliary magnetic pole, the main magnetic pole being a carbon nanotube which is doped with nitrogen and exhibits magnetism.

The carbon nanotube exhibits ferromagnetism if it has a difference in electron density at both ends thereof.

BRIEF DESCRIPTION OF THE DRAWINGS

Other objects and advantages of the invention will become apparent from the following description of various embodiments, with reference to the accompanying drawings, in which.

DETAILED DESCRIPTION OF THE PREFERRED EMBODIMENTS

Embodiment 1

Figure 1:
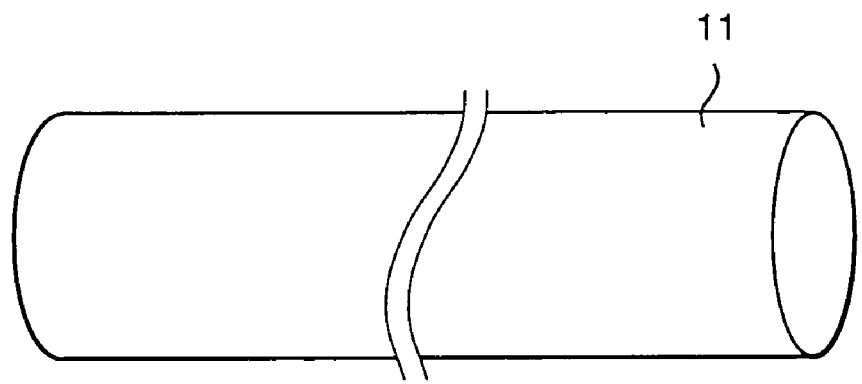
FIG. 1 is a schematic diagram of a single-wall carbon nanotube.
Figure 2:
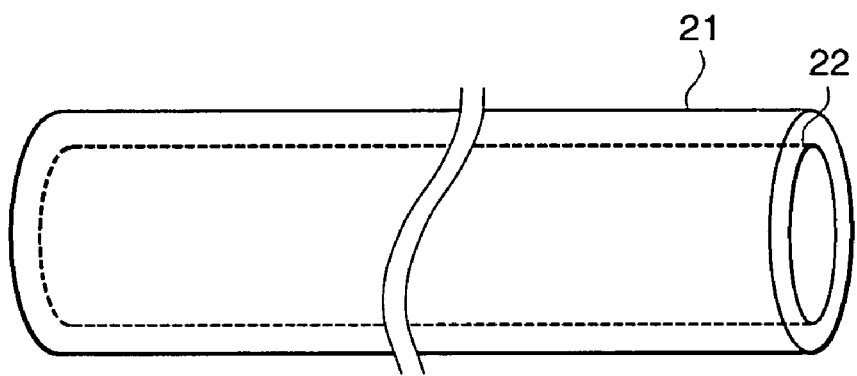
FIG. 2 is a schematic diagram of a multi-wall carbon nanotube.

FIGS. 1 and 2 are schematic diagrams showing a carbon nanotube. FIG. 1 shows a carbon nanotube having a cylindrical shape, which is composed of a single graphite layer 11. It is referred to as a single walled carbon nanotube (SWCNT). FIG. 2 shows a carbon nanotube, having a cylindrical shape, which is composed of an outer graphite layer 21 and an inner graphite layer 22. It is referred to as a multi-walled carbon nanotube (MWCNT). Incidentally, a MWCNT includes not only those structures composed of two walls, but also those structures composed of three or more walls. In addition, some kinds of SMCNT and MWCNT have their ends covered with a semispherical cap composed of five-membered rings. Such a cap is called a "fullerene cap".

Figure 3:
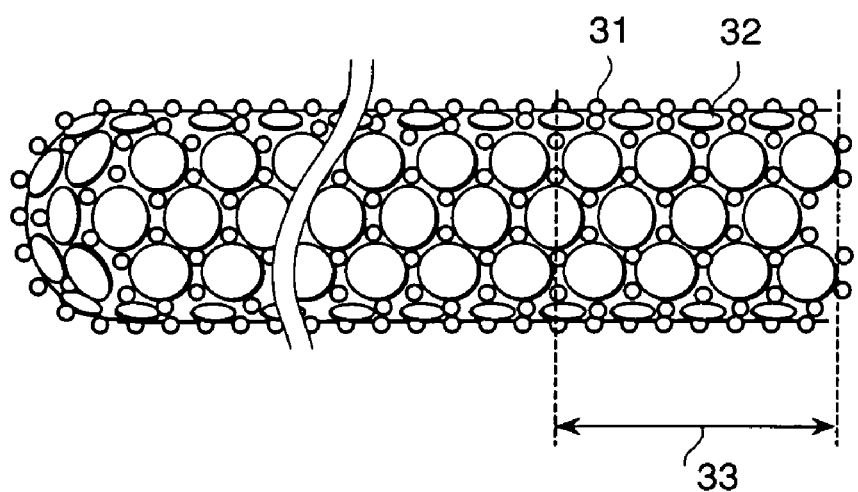
FIG. 3 is a sectional schematic diagram of the carbon nanotube pertaining to the present invention.

FIG. 3 is a schematic diagram showing a carbon nanotube pertaining to the present invention. This carbon nanotube has some of its constituent carbon atoms 32 replaced by doped nitrogen atoms 31, and it possesses a carbon-nitrogen mixed region 33 only at one end thereof. If the carbon nanotube has at least one end thereof that is left open, or is closed with a metal cap in place of a fullerene cap, the doped nitrogen easily segregates itself at one end thereof. Incidentally, the doped nitrogen does not exist in the carbon nanotube, except for the carbon-nitrogen mixed region.

The nitrogen-doped carbon nanotube can be obtained by allowing a mixture gas of $C_2H_2$ and $N_2$ to flow by chemical vapor deposition (CVD) under the following conditions (given as an example).
Microwave power: 1000 W
Flow rate of $C_2H_2$: 15 sccm
Flow rate of $N_2$: 50 sccm
Temperature: 150° C.

Alternatively, it may also be obtained by DC magnetron sputtering with a graphite target in a mixed gas of argon and nitrogen.

Figure 4:
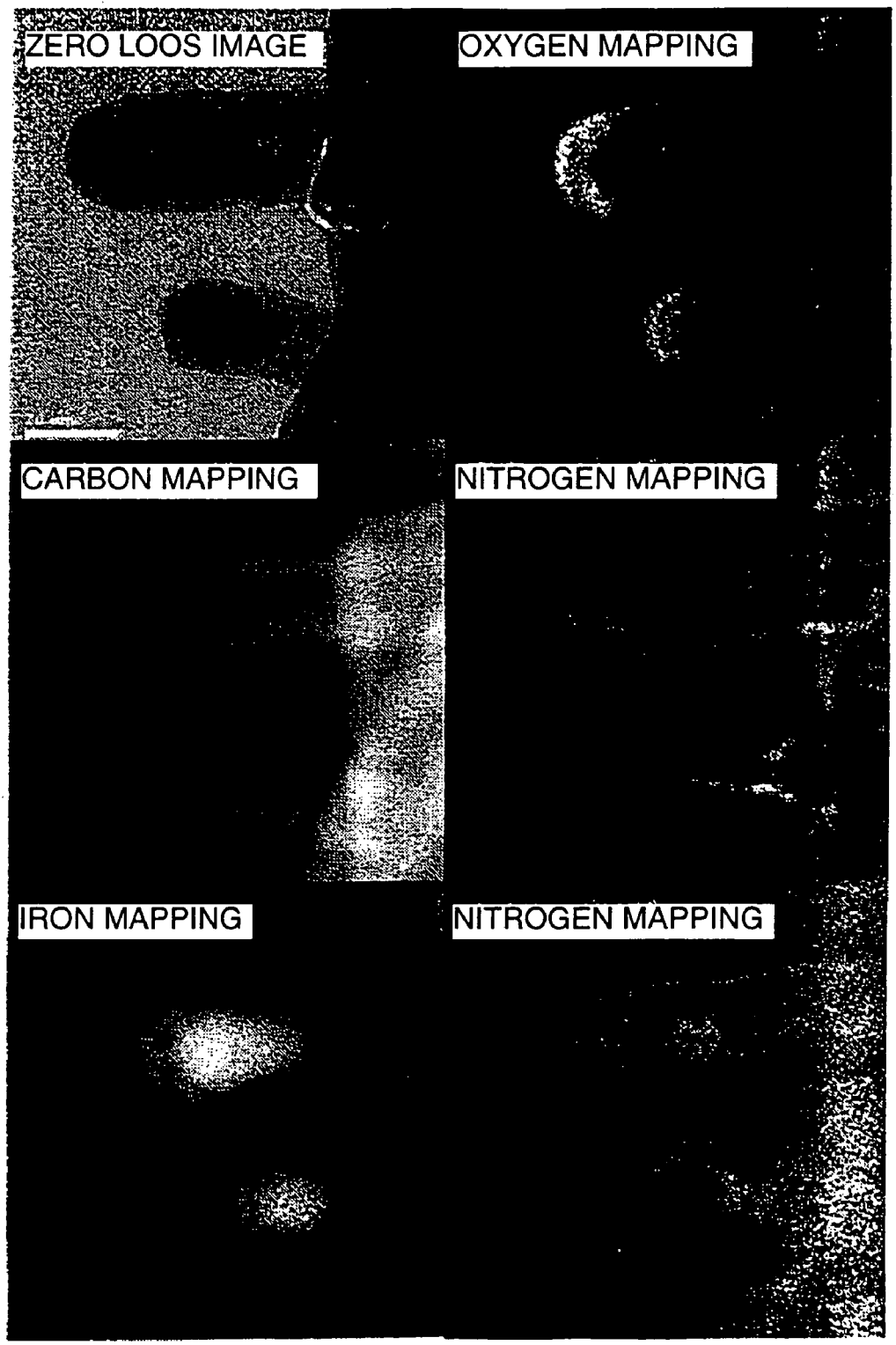
FIG. 4 is a diagram showing the results of EELS analysis of the carbon nanotube pertaining to the present invention.

FIG. 4 shows the result of electron energy loss spectroscopy (EELS) which was obtained when a nitrogen-doped carbon nanotube, having an iron cap at its end, was heated at 400° C. for 10 seconds. The measurement was carried out using Hitachi's transmission electron microscope HF2000 and Gatan's GIF. It is noted from the iron mapping of FIG. 4 that the carbon nanotube has its end closed by an iron cap, instead of a fullerene cap. It is also noted from the nitrogen mapping of FIG. 4 that the carbon nanotube has doped nitrogen segregated in a strip form spaced about 10–15 nm away from the end thereof. This suggests that a carbon-nitrogen mixed region exists there. Incidentally, the amount of nitrogen in the carbon nanotube as a whole was about 6% in terms of atomic ratio. Although there are no specific restrictions on the amount of nitrogen in the carbon nanotube, at least 0.1% is necessary for the carbon nanotube to exhibit magnetism. However, the amount of nitrogen should preferably be no more than 30%, so as to ensure its partial segregation at only one end of the carbon nanotube.

Figure 5:
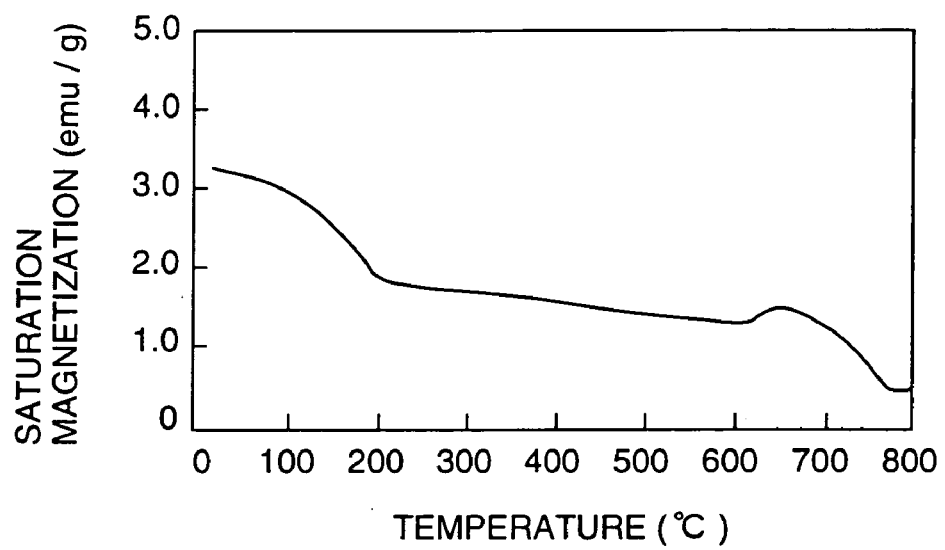
FIG. 5 is a graph showing the results of measurement by VSM of magnetism of the carbon nanotube pertaining to the present invention.

The carbon nanotube pertaining to the present invention possesses the magnetic characteristics as shown in FIG. 5, which were obtained by measurements with a vibrating sample magnetometer (VSM) produced by Riken Denshi Co., Ltd. The abscissa represents temperature (° C.), and the ordinate represents saturation magnetization (emu/g). It is noted from FIG. 5 that the saturation magnetization of the carbon nanotube pertaining to the present invention decreases slowly with an increase in the temperature in the range of about 200° C. to 600° C. It is also noted that it remains magnetized even at a high temperature of 800° C. In other words, the carbon nanotube with an iron cap remains magnetized even at temperatures of 770° C. and above, which is a Curie point of iron. These observations suggest the presence of ferromagnetism in the carbon nanotube.

Although the effect of doping with nitrogen was demonstrated above in connection with this Embodiment, the dopant is not limited to nitrogen. For example, a carbon nanotube doped with boron exhibits ferromagnetism so long as it retains the same electron density at its one end. In addition, the metal in the carbon nanotube is not limited to iron. Iron may be replaced by cobalt or nickel for obtaining the same effect.

Embodiment 2

Figure 6:
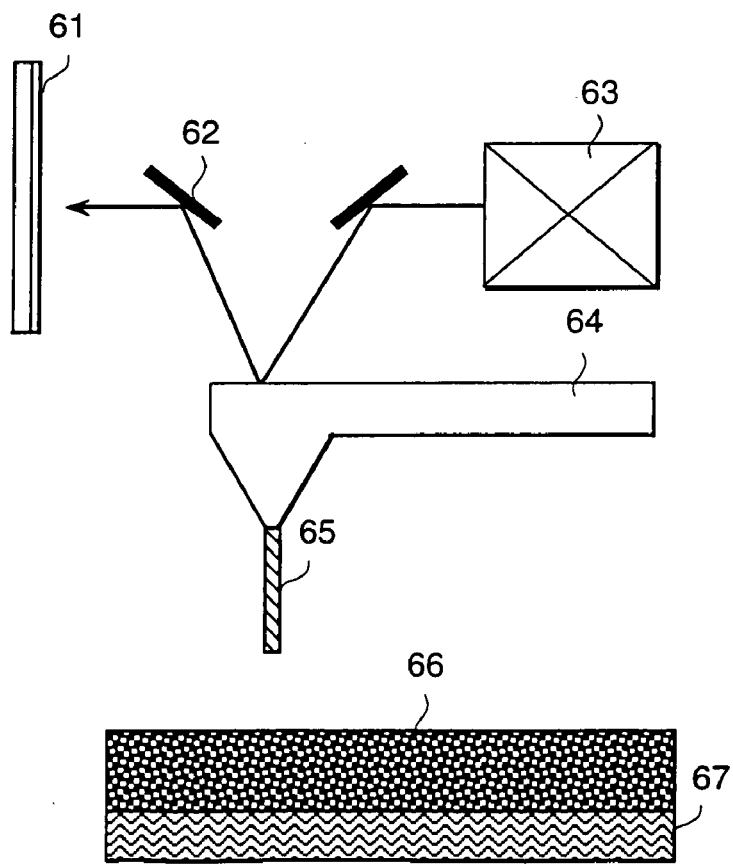
FIG. 6 is a schematic diagram of the magnetic force microscope provided with the carbon nanotube pertaining to the present invention.

FIG. 6 is a schematic diagram showing a magnetic force microscope whose magnetic probe 65 is the carbon nanotube represented by Embodiment 1. The magnetic force microscope is made up of a laser emitter 63, a reflecting mirror 62, an optical detector 61, a cantilever 64, and a magnetic probe 65 that is attached to the cantilever 64, said magnetic probe 65 being the carbon nanotube of Embodiment 1. Incidentally, the specimen 66 being observed under the magnetic force microscope may be heated by a heater 67, if necessary.

The following method is used to attach the carbon nanotube 65 to the cantilever 64. First, a cluster of carbon nanotubes 65 is brought into contact with the tip of the cantilever 64. The resulting assemblage is placed in a focused ion beam (FIB) apparatus. A gas containing a tungsten compound is blown toward the base of the carbon nanotube in contact with the tip of the cantilever 64 during irradiation with a gallium ion beam, so that the following reaction takes place. This operation is carried out under image observation.

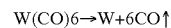

This reaction gives rise to tungsten, which bonds the carbon nanotube 65 to the cantilever 64. Incidentally, the magnetic force microscope is made up of a cantilever 64 having a carbon nanotube bonded thereto, a laser emitter 63, a reflecting mirror 62, and an optical detector 61.

The resulting magnetic force microscope functions in the following way. The cantilever 64, afloat a few nanometers to hundreds of nanometers above a sample 66, is scanned with vibration at a frequency close to its resonant frequency. As the carbon nanotube 65 approaches a certain position of the sample where a magnetic force gradient exists, the resonance point of the cantilever 64 shifts. The amount of shift is determined by the optical detector 61, which receives the laser beam from the laser emitter 63 after reflection at the end of the cantilever 64. The amount of shift thus determined provides an image of the magnetic gradient. Incidentally, the magnetic force microscope pertaining to this embodiment may be incorporated into an apparatus to inspect magnetic recording media in their production process. It offers a marked advantage, particularly in the case where a carbon nanotube without an iron cap is used as a magnetic probe. It is mechanically strong, without the possibility of iron particles dropping off, and it retains a constant amount of magnetization despite its contact with a heated sample. Therefore, it is capable of accurate evaluation of magnetic characteristics. A single carbon nanotube used as a probe is suitable for high-resolution measurement. Two carbon nanotubes used in combination will offer higher strength and durability. This also applies to the next embodiment.

Embodiment 3

Figure 7:
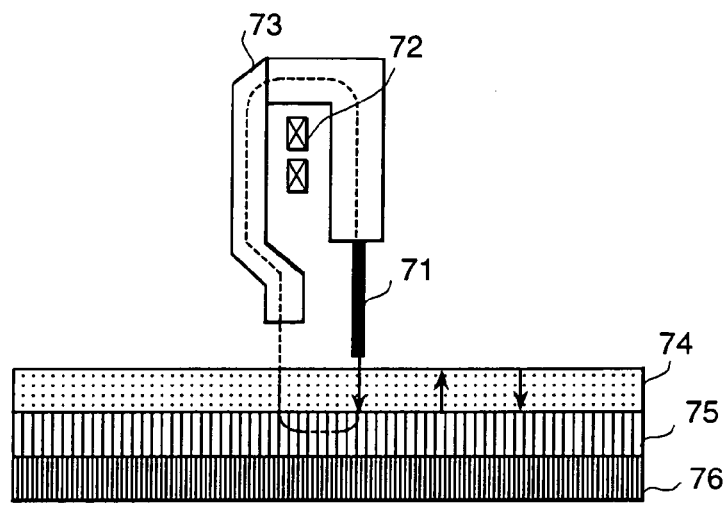
FIG. 7 is a schematic diagram of the magnetic head provided with the carbon nanotube pertaining to the present invention.

This Embodiment demonstrates the use of a carbon nanotube (pertaining to Embodiment 1) as the main magnetic pole of a head for a vertical magnetization memory. The head, which is schematically shown in FIG. 7, has an exciter 72 to generate a magnetic field that constitutes a closed magnetic circuit passing through the carbon nanotube 71, serving as the main magnetic pole, the recording medium 70, and the auxiliary magnetic pole 73.

The head for the vertical magnetization memory has the property that its recording/reproducing characteristics depend largely on the tip size of the main magnetic pole. The tip should have as small a radius of curvature as possible. Since the carbon nanotube in this embodiment has a high aspect ratio and also exhibits ferromagnetism, it permits high-density vertical magnetization in a memory medium. A carbon nanotube without a ferromagnetic metal cap may also be used as the main magnetic pole. It has no possibility of breakage and of metal particles dropping off. In addition, the main magnetic pole becomes strong mechanically and remains stable to heat generated by contact between the magnetic head and the recording medium, thereby retaining a constant amount of magnetization. This contributes to dependable recording and reproducing.

Figure 8:
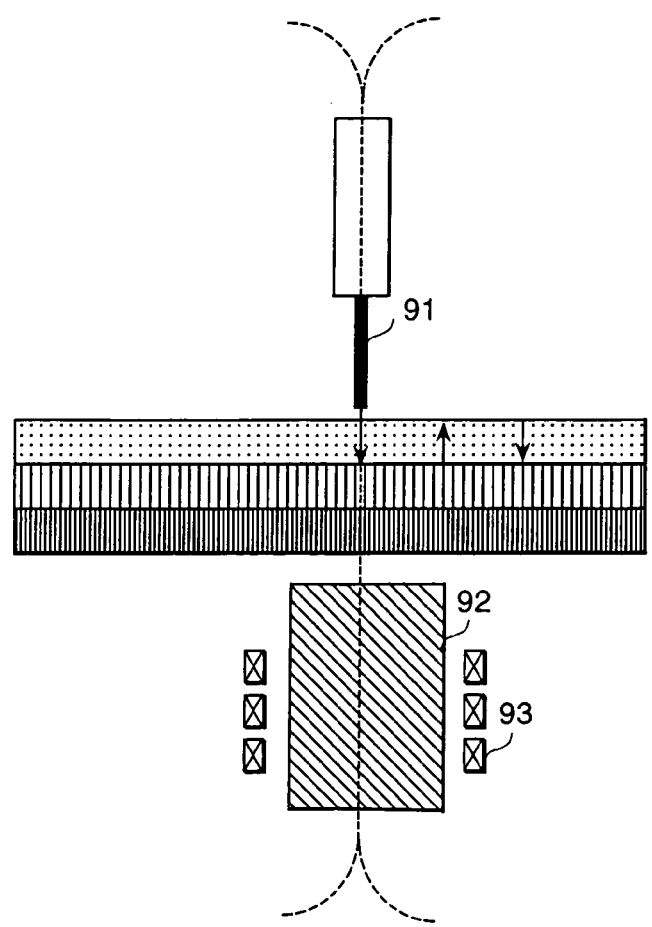
FIG. 8 is a schematic diagram of the magnetic head provided with the carbon nanotube pertaining to the present invention.

Although this embodiment illustrates an annular head for a vertical magnetization memory, the annular head may be applied to the main magnetic pole of a W-shaped head. In addition, the annular head may be applied to the main magnetic pole of a head constructed such that the recording medium is held between the main magnetic pole and the auxiliary magnetic pole 92, as shown in FIG. 8.

The above-mentioned embodiment of the present invention is directed to a head for a vertical magnetization memory which consists of a main magnetic pole, an auxiliary magnetic pole, and an exciter. Needless to say, the head embraces one which is constructed such that the recording medium is held between the main magnetic pole and the auxiliary magnetic pole.

As mentioned above, the present invention provides a carbon nanotube exhibiting ferromagnetism and having a high thermal stability, and an apparatus provided therewith.

While the invention has been described in relation to its preferred embodiments, it is to be understood that the words which have been used are words of description rather than limitation and that changes within the purview of the appended claims may be made without departing from the true scope and spirit of the invention in its broader aspects.

What is claimed is:

1. A magnetic force microscope, which comprises a laser emitter, an optical detector and a cantilever to which at least one carbon nanotube is bonded as a magnetic probe, the at least one carbon nanotube being doped with nitrogen or boron, wherein the at least one carbon nanotube has a difference in electron density at both ends thereof, thereby showing feromagnetism.

2. The magnetic force according to claim 1, wherein the at least one carbon nanotube is bonded by tungsten.

3. The magnetic force microscope according to claim 1, wherein the at least one carbon nanotube includes a plurality of carbon nanotubes.

4. The magnetic force microscope according to claim 1, wherein the at least one carbon nanotube contains segregated nitrogen at one end thereof.

5. The magnetic force microscope according to claim 1, wherein the at least one carbon nanotube contains segregated nitrogen at only one end thereof.

6. The magnetic force microscope according to claim 1, wherein the at least one carbon nanotube has a mixed region of carbon and nitrogen at only one end thereof.

7. The magnetic force microscope according to claim 1, wherein the at least one carbon nanotube has a mixed region of carbon and nitrogen.

8. A magnetic force microscope, which comprises a laser emitter, an optical detector and a cantilever to which a plurality of carbon nanotubes are bonded as a magnetic probe, wherein the plurality of carbon nanotubes have a difference in electron density at both ends thereof, thereby showing ferromagnetism.

9. The magnetic force microscope according to claim 8, wherein the plurality of carbon nanotubes contain segregated nitrogen at one end thereof.

10. The magnetic force microscope according to claim 8, wherein the plurality of carbon nanotubes have a mixed region of carbon and nitrogen.

11. The magnetic force microscope according to claim 8, wherein the plurality of carbon nanotubes have a mixed region of carbon and nitrogen at only one end thereof.

12. The magnetic force microscope according to claim 8, wherein the plurality of carbon nanotubes contain segregated nitrogen at only one end thereof.

13. A magnetic force microscope, which comprises a laser emitter, an optical detector and a cantilever to which a plurality of carbon nanotubes are bonded as a magnetic probe, wherein the plurality of carbon nanotubes have a mixed region of carbon and nitrogen at only one end.

14. A magnetic force microscope, which comprises a laser emitter, an optical detector and a cantilever to which a plurality of carbon nanotubes are bonded as a magnetic probe, wherein the plurality of carbon nanotubes contain segregated nitrogen at only one end thereof.

15. A magnetic force microscope, which comprises a laser emitter, an optical detector and a cantilever to which at least one carbon nanotube is bonded as a magnetic probe, the at least one carbon nanotube being doped with nitrogen or boron, wherein the at least one carbon nanotube has a mixed region of carbon and nitrogen at only one end thereof.

16. A magnetic force microscope, which comprises a laser emitter, an optical detector and a cantilever to which at least one carbon nanotube is bonded as a magnetic probe, the at least one carbon nanotube being doped with nitrogen or boron, wherein the at least one carbon nanotube contains segregated nitrogen at only one end thereof.

* * * * *